(12) United States Patent
Daly (10) Patent No.: US 10,902,685 B2
(45) Date of Patent: Jan. 26, 2021

(54) AUGMENTED REALITY REMOTE AUTHORING AND SOCIAL MEDIA PLATFORM AND SYSTEM

(71) Applicant: John T. Daly, Frederick, MD (US)

(72) Inventor: John T. Daly, Frederick, MD (US)

(*) Notice: Subject to any disclaimer, the term of this patent is extended or adjusted under 35 U.S.C. 154(b) by 0 days.

(21) Appl. No.: 16/714,084

(22) Filed: Dec. 13, 2019

(65) Prior Publication Data

US 2020/0193717 A1 Jun. 18, 2020

Related U.S. Application Data

(60) Provisional application No. 62/779,177, filed on Dec. 13, 2018.

(51) Int. Cl.
*G06T 19/20* (2011.01)
*G06T 15/06* (2011.01)
(Continued)

(52) U.S. Cl.
CPC ............ *G06T 19/20* (2013.01); *A63F 13/213* (2014.09); *A63F 13/65* (2014.09); *G06N 3/04* (2013.01);
(Continued)

(58) Field of Classification Search
CPC ......... G06T 15/06; G06T 15/50; G06T 15/60; G06T 17/00; G06T 19/00; G06T 19/003; G06T 19/006; G06T 19/20; G06T 2210/56; G06T 2215/12; G06T 2219/2004; G06T 2200/08; A63F 13/213; A63F 13/216; A63F 13/63; A63F 13/65; G06F 3/011; G06N 3/04; H04L 9/0894; H04L 9/0637; H04L 9/3239; H04L 9/3297; H04L 63/102; H04L 2209/38
(Continued)

(56) References Cited

U.S. PATENT DOCUMENTS 6,426,745 B1 * 7/2002 Isaacs ................. G06F 3/04845
345/419
7,246,044 B2 * 7/2007 Imamura ................. G06F 30/13
703/1

(Continued)

*Primary Examiner* — Sae Won Yoon
(74) *Attorney, Agent, or Firm* — U. Maryland Baltimore Carey School of Law MIPLRC/IPEC (57) ABSTRACT

Frontend and backend systems and processes. Technical foundations on which an Augmented Reality (AR) platform, such as an AR Social Media Platform. Systems and methods are used to construct and manage an AR Cloud backend and frontend environment facilitation: persistent 3-Dimensional and 2-Dimensional geo-located content that can be created, viewed, changed, and interacted with by users in the same or different sessions; ephemeral content; local creation and posting of content; remote creation and posting of content; remote visualization, altering, and placing content on a 3D map; filtering and management of content in the camera view based on a visibility layer/similar theme and content priority based on preferences, categorization, and ownership; automated creation and posting; lighting of content and digital environments; linking of point clouds with real-world geo-coordinates for accurate map construction; and the security of property and content rights and ownership via smart contracts on a blockchain.

11 Claims, 12 Drawing Sheets

(51) Int. Cl.
*A63F 13/213* (2014.01)
*A63F 13/65* (2014.01)
*H04L 29/06* (2006.01)
*H04L 9/06* (2006.01)
*G06N 3/04* (2006.01)

(52) U.S. Cl.
CPC ............ *G06T 15/06* (2013.01); *H04L 9/0637* (2013.01); *H04L 63/102* (2013.01); *G06T 2200/08* (2013.01); *G06T 2210/56* (2013.01); *G06T 2215/12* (2013.01); *G06T 2219/2004* (2013.01); *H04L 2209/38* (2013.01)

(58) Field of Classification Search
USPC ....................................................... 345/421
See application file for complete search history.

(56) References Cited

U.S. PATENT DOCUMENTS

| | | | |
|---|---|---|---|
| 8,644,859 B2 | 2/2014 | Hyung et al. | |
| 9,122,321 B2 | 9/2015 | Perez et al. | |
| 9,495,783 B1 | 11/2016 | Samarasekera et al. | |
| 9,633,447 B2 | 4/2017 | Swaminathan et al. | |
| 9,865,091 B2 | 1/2018 | Giraldi et al. | |
| 9,940,755 B2 | 4/2018 | Carter et al. | |
| 10,250,948 B1 | 4/2019 | Bortz et al. | |
| 10,262,462 B2 | 4/2019 | Miller et al. | |
| 10,311,643 B2 | 6/2019 | Daniels et al. | |
| 10,339,721 B1* | 7/2019 | Dascola | G06F 1/1643 |
| 10,373,342 B1* | 8/2019 | Perez, III | G06T 7/97 |
| 10,535,199 B1* | 1/2020 | Bond | G06T 15/08 |
| 2003/0085992 A1* | 5/2003 | Arpa | G08B 13/19608 348/47 |
| 2008/0246757 A1* | 10/2008 | Ito | H04N 13/305 345/419 |
| 2011/0159957 A1* | 6/2011 | Kawaguchi | G06F 3/012 463/31 |
| 2012/0233555 A1 | 9/2012 | Psistakis et al. | |
| 2013/0335405 A1* | 12/2013 | Scavezze | A63F 13/10 345/419 |
| 2014/0095497 A1* | 4/2014 | Howe | G06F 16/29 707/736 |
| 2015/0356782 A1 | 12/2015 | Miller et al. | |
| 2016/0133230 A1 | 5/2016 | Daniels et al. | |
| 2017/0243403 A1 | 8/2017 | Daniels et al. | |
| 2017/0323160 A1* | 11/2017 | Porsch | G06K 9/00671 |
| 2018/0213359 A1 | 7/2018 | Reinhardt et al. | |
| 2018/0308379 A1* | 10/2018 | Webb | G06F 30/15 |
| 2019/0019338 A1* | 1/2019 | Sato | G06T 13/40 |
| 2019/0088025 A1* | 3/2019 | Tamanaha | G06F 3/0484 |
| 2019/0094981 A1* | 3/2019 | Bradski | G02B 27/0093 |
| 2019/0130655 A1 | 5/2019 | Gupta et al. | |
| 2019/0188918 A1* | 6/2019 | Brewer | G06F 3/04815 |
| 2019/0385379 A1* | 12/2019 | Woo | G06F 3/011 |

* cited by examiner

AUGMENTED REALITY REMOTE AUTHORING AND SOCIAL MEDIA PLATFORM AND SYSTEM

CROSS-REFERENCE TO RELATED APPLICATIONS

This application claims priority to U.S. Provisional Application Ser. No. 62/779,177, filed Dec. 13, 2018, the disclosure of which is incorporated by reference in its entirety.

BACKGROUND

Conventionally, authoring for augmented reality (AR) experiences and applications is limited by ephemeral sessions, where the 3D content largely has to be authored locally for markerless AR, or is authored via what is known as marker-based AR. Spatial anchors shared between users via a mutual server provide a more integrated and persistent experience, but that method lacks consistent accuracy in the placement of content. Additionally, spatial 3D mapping of environments brings inherent user, data, and property privacy and security issues that have yet to be solved at a broad scale.

DETAILED DESCRIPTION

The present invention will be described in the preferred embodiments. The invention may, however, be embodied in many different forms and should not be construed as being limited to the embodiments set forth herein; rather, these embodiments are provided so that this disclosure will be thorough and complete, and will fully convey the concept of the invention to those skilled in the art.

This invention describes methods to author content remotely and locally, as well as the methods and systems needed to be in place to facilitate such an endeavor, such as a shared 3D map of the environment, standardization of maps via conversion of local euclidean coordinates to global geodesic coordinates, as well as a system for managing spatial data ownership in regards to viewing and authoring content within the bounds of public and/or private digital-spatial property.

Figure 1:
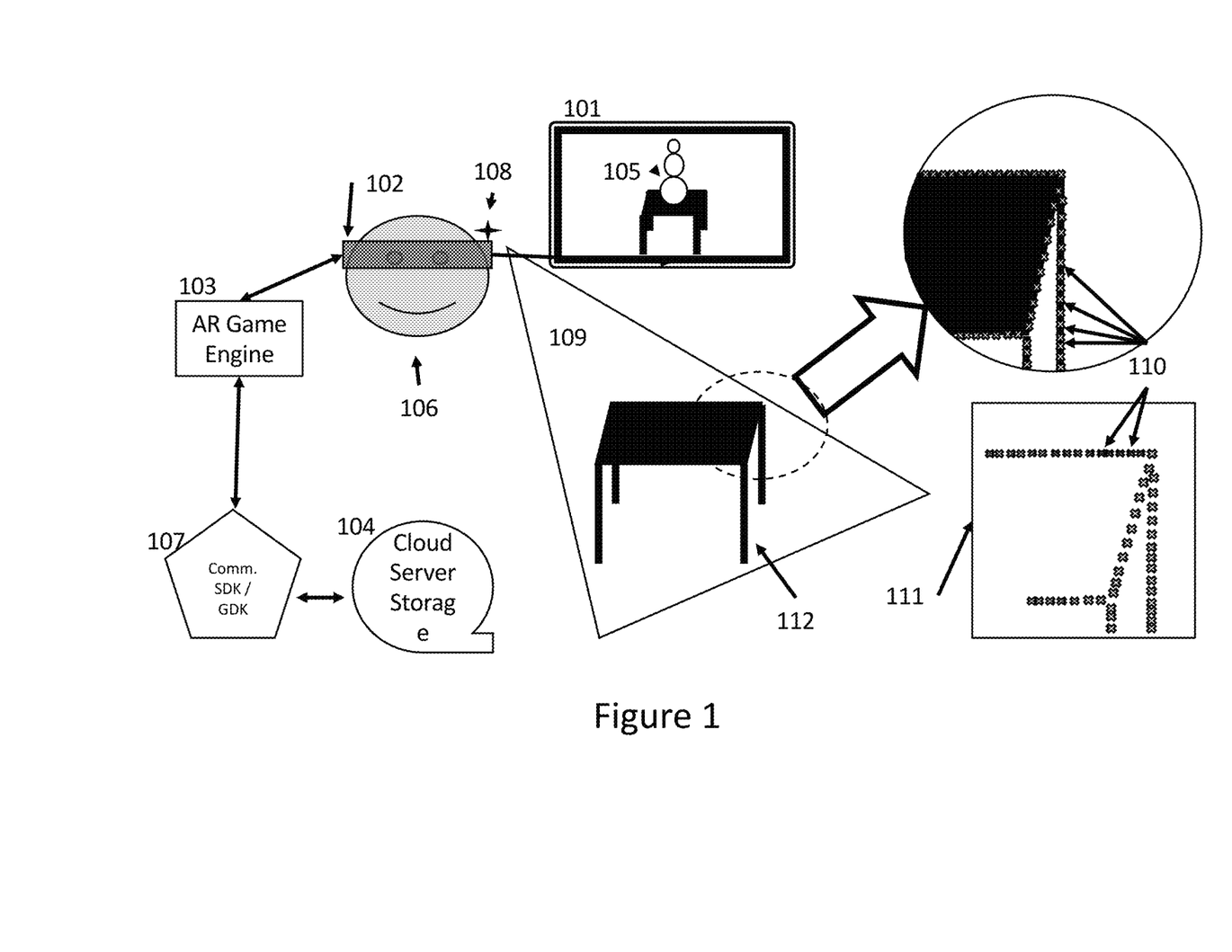
FIG. 1 is an overview of an embodiment of a system illustrating a game engine, a cloud server, a real-world environment, an augmented reality environment, many points within the augmented reality environment, and a point cloud.
Figure 7:
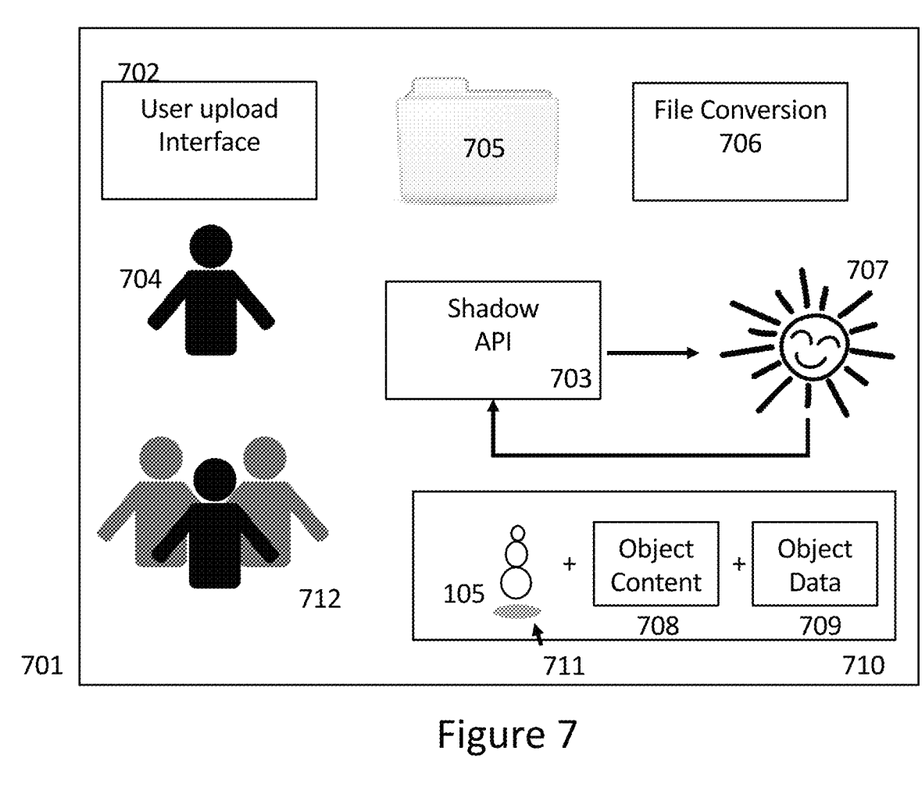
FIG. 7 describes a method that an author follows to upload objects into the system, according to an embodiment.
Figure 11:
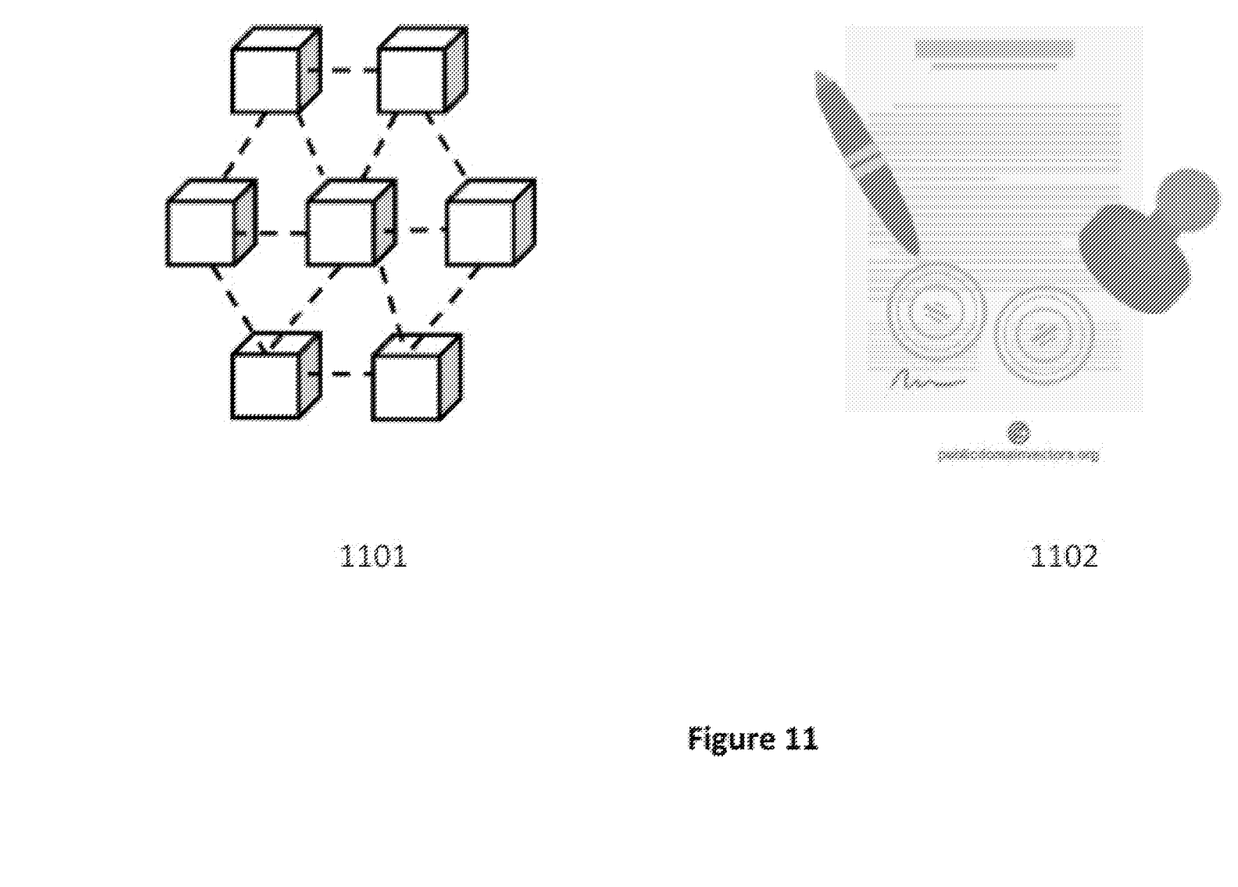
FIG. 11 demonstrates an embodiment of blockchain and a secure contract.

A conventional augmented reality (AR) system stores objects 105 in a local library to display for a user 106 on the user's phone or through specially designed glasses 102. The conventional system triggers displaying the objects 105 based on a target. The present invention improves on the conventional system. Users 106 of the present invention can collaborate to generate a digital globally-mapped, persistent 3D environment 101. In one embodiment of the invention, users remotely author content 701 to manually or automatically display locally or globally. In another embodiment of the invention, users 106 protect their content 105 through blockchain-encrypted 1101 smart contracts 1102. In another embodiment, the system 103 (also referenced herein as the game engine) provides security for property owners 1003 through blockchain-encrypted 1101 smart contracts 1102. Another embodiment allows users 106 to filter content 105 displayed to them within the AR environment 101.

An embodiment of this invention includes a game engine 103 in conjunction with an integrated cloud-server system 104. The gaming engine 103 communicates with the cloud-server system 104 through a software development kit (SDK) 107 or a Graphics Development Kit (GDK) 107. The gaming engine SDK 103 services the construction and management of 3D environments 111. For example, a gaming engine SDK 103 or application programming interface (API) 103 provides a rendering engine, a physics engine, collision detection, sound, scripting, animation, AI, networking, streaming, memory management, threading, localization support, scene graph, and AR camera tracking.

The present invention is based on a 3D point cloud environment 111 (AR Cloud) that is generated by a user 106 by utilizing the cameras 108 and sensors on the user's 106 client device 102. These sensors may include, but are not limited to, gyroscopes, accelerometers, Global Positioning System (GPS), Bluetooth Low Energy (BLE), and WiFi.

Figure 4:
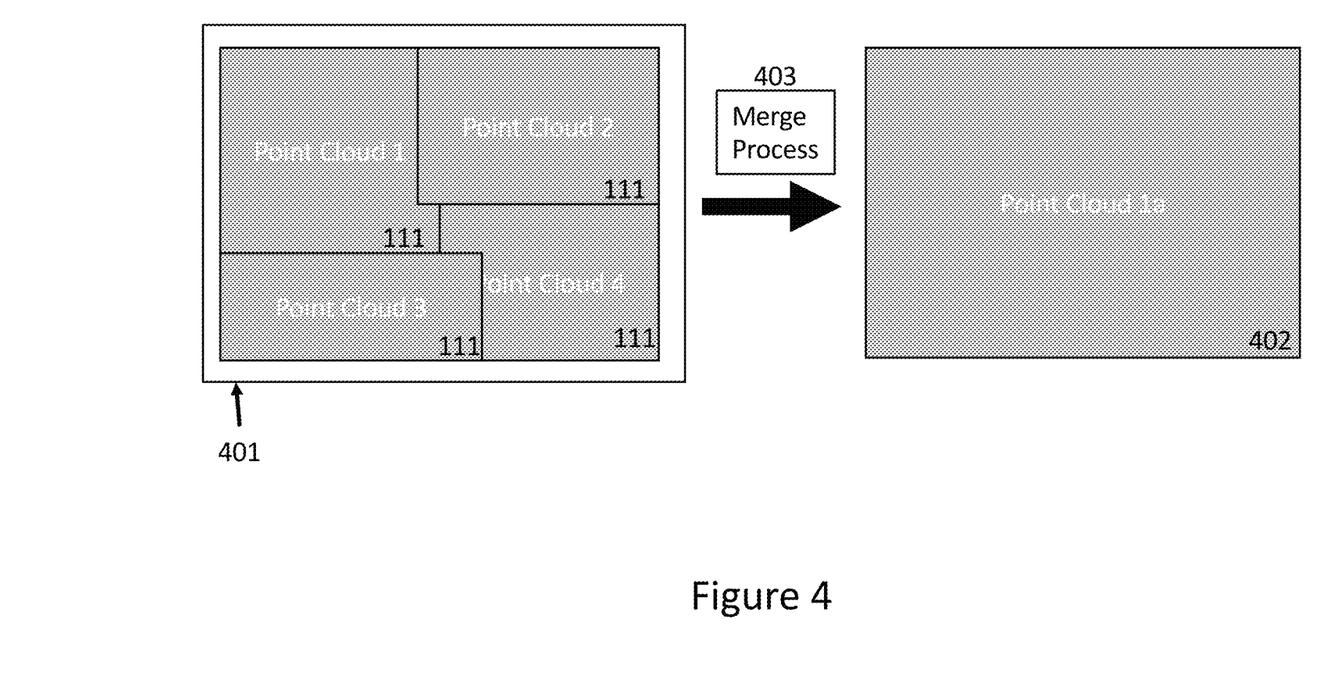
FIG. 4 demonstrates how multiple point clouds merge to create a larger point cloud mesh in an embodiment of the invention.
Figure 12:
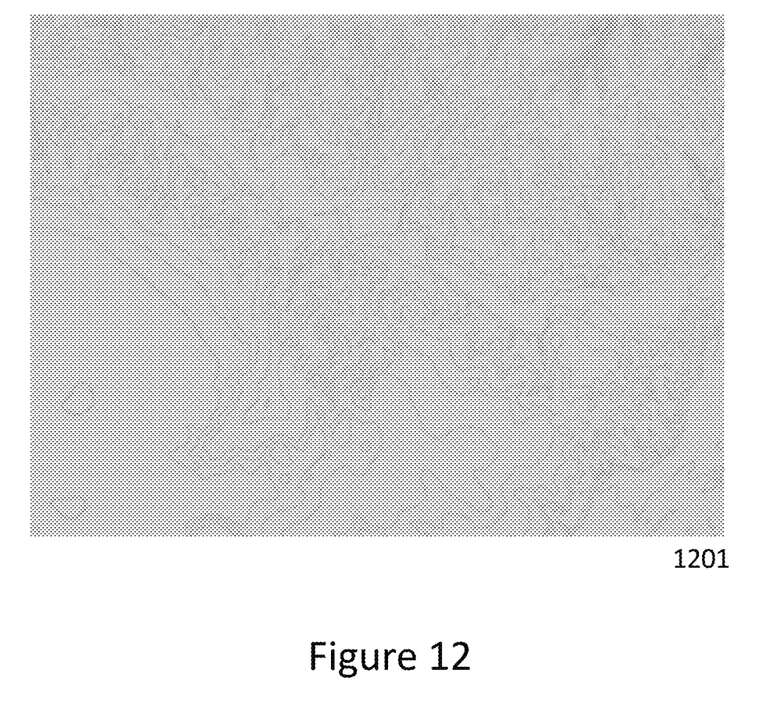
FIG. 12 is a general topographic map which would eventually have point clouds overlay as users digitally map the environment in an embodiment of the invention.

In an embodiment of the invention, an augmented reality system 103 merges a user's 106 locally created 3D cloud environment 111 with a base digital topological map 1201 of the world constructed out of polygon-meshes and planes. The base map includes 3D buildings, such as skyscrapers, but the buildings have the option of being edited with point clouds 111 and meshes. The merging 403 of locally generated content 105 with the base map creates a 1:1 scale digital representation of the real, physical world while users explore and map the world. The system 103 stores the topological map 1201 on a series of linked servers 104 or a cloud based server 104.

Figure 8:
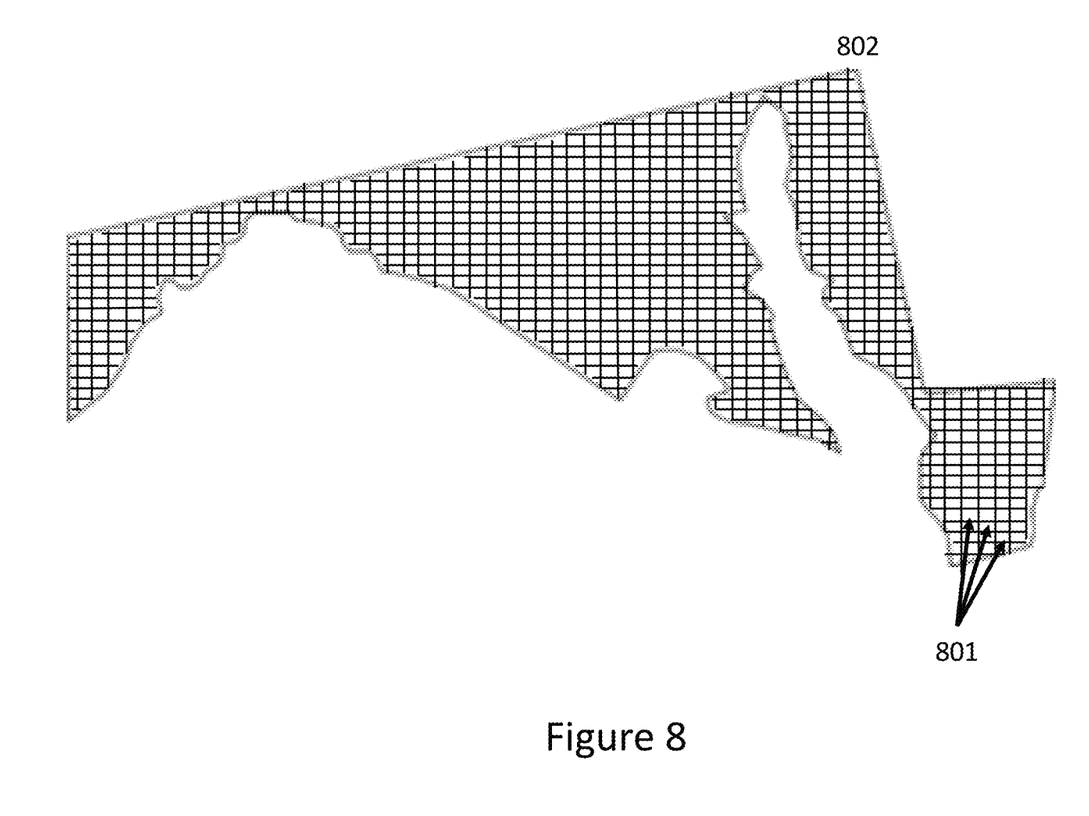
FIG. 8 is a not-to-scale rendering of one state map and a general breakdown of tiles.

The invention divides the base map into 10 meter×10 meter sections, referred to herein as tiles 801. The user-generated 3D point cloud environments 111 are linked to the base map based on the tile 801 where the user 106 is located. The system 103 tracks the user's 106 position in the 3D environment. The system 103 downloads digital content to the user's device based on the tile 801 in which the user is located instead of downloading the entire world map.

The system 103 makes a GPS API call 210 to facilitate localization of the user. The user's device 102 generates a geo-reference point 211 corresponding to its location, through a geo-reference system including, but not limited to, GPS, WiFi localization, LiFi localization, cellular phone localization, BLE beacons, or a combination thereof. The system 103 attempts to merge the user's 3D environment point cloud 111 to any overlapping previously saved point clouds 111 in tiles 801 near the user's location because the geo-reference point might not be accurate. Features are matched 307 between the user point cloud and the system point clouds 111. The system merges the user's point cloud 111 with the system point cloud 111 that matches the most features. The merged point cloud 402 consists of two or more overlapping point clouds 111. The system 103 saves the merged point cloud 402 the server as a subordinate point cloud 402 under the identification number of the old point cloud 111.

As new point clouds 111 are merged 403, the merges compound to create one large point cloud 402 with individual subsets of point clouds 401 for optimized searching. After merging, the point clouds are broken into tile 801 groups where the system 103 assigns a unique tile identification number to each voxel within the go-coordinates of the tile 801. The tile 801 contains the voxels and geo-coordinates from many different point clouds 111 that existin within the tile 801, optimizing the download process of point clouds 111 to a client device 102.

One embodiment of the invention utilizes an AR camera 108 on the client device 102. The AR camera 108 provides a viewport into the digital 3D environment 101 through raycasting provided by the system 103. The system 103 listens for and registers which 3D objects 105 are being virtually touched and interacted with through the AR camera's 108 field of vision (FOV) 109.

Several processes may happen concurrently while the AR camera 108 is open or active. The system 103 makes a GPS call 210 to determine the device's location 211. The system 103 searches for any pre-existing point clouds 111 geo-tagged with IDs within a predetermined geo-coordinated radius. The system 103 downloads 305 any existing point clouds 111 and their corresponding tiles 801 within the radius. The system 103 uses third-party Simultaneous Localization and Mapping (SLAM) and relocalization APIs to relocalize the client device within the pre-existing point cloud environment 111. The system 103 relocalizes the client device 102 by matching monochrome or colored features in the image frames between the preexisting point clouds 111 and the current image frame 101 of the camera 102 feed. The system also utilizes image processing APIs and computer vision APIs to to relocalize the client device within the pre-existing point cloud environment 111.

Figure 9:
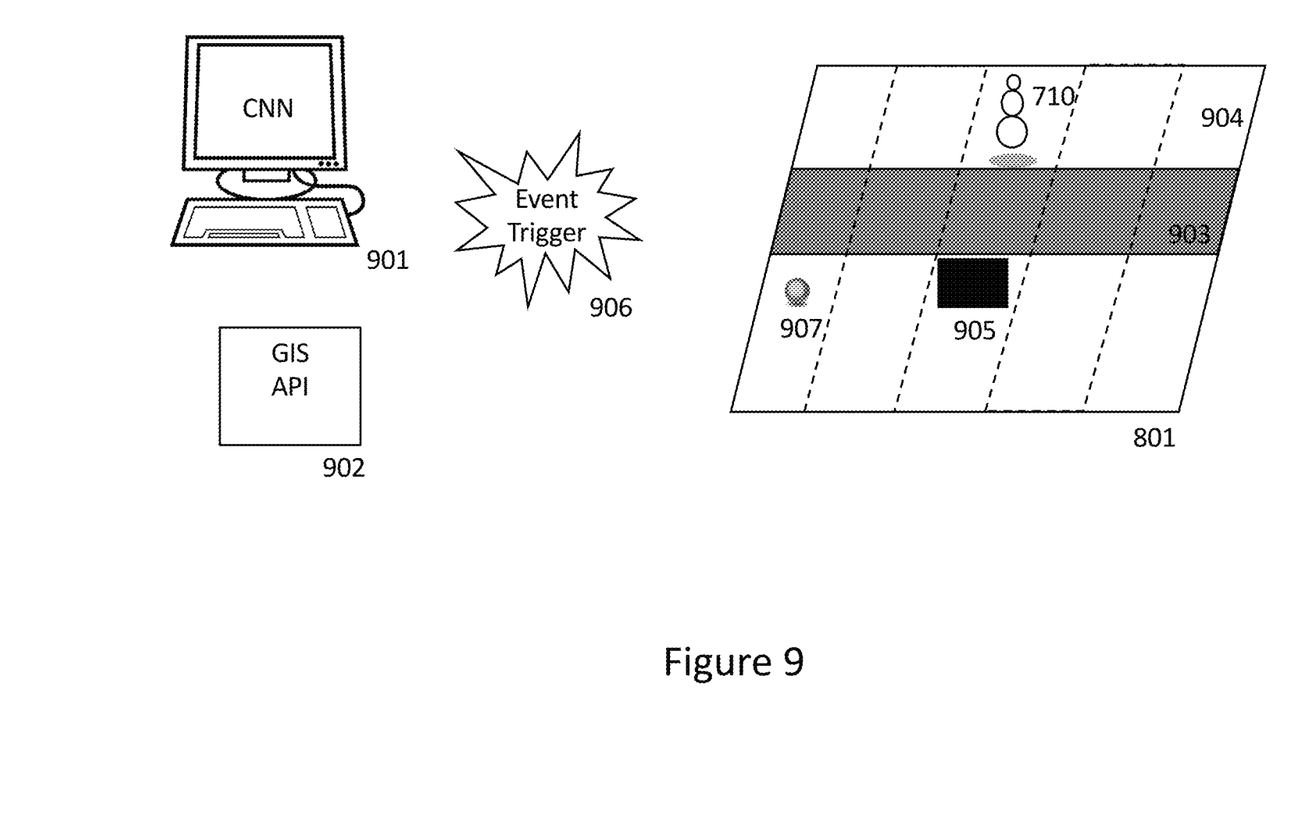
FIG. 9 demonstrates a method of determining the optimum location within a tile for users to automatically post content, according to an embodiment.

A convolutional neural network (CNN) 901 compares the provided, retrieved, and calculated depths of the feature points 110 for images frames that share a different lighting. The CNN 901 compares the 3D shapes of the point clouds 111 generated in the image frames to enhance the localization process and provide better accuracy in low and contrasting light situations between the current and the saved camera frame. One method of achieving the CNN comparison is through a object recognition API.

The system 103 may capture additional point clouds 111 that did not already exist in the pre-existing point cloud environment 111 if relocalization is successful. Through SLAM APIs the system 103 differentiates by feature-matching points 110 already in the pre-existing point cloud 111 with newly generated points 110 and eliminates the newly-generated points 110 that matched with points 110 already in the pre-existing point cloud 111. SLAM APIs localize the camera 108 in the spatial environment, while simultaneously generating a 3D point cloud map 111 of the spatial environment. Depending on the client device, a Mono-SLAM API or a Stereo-SLAM API calculates depth through triangulation or through client device-equipped hardware that calculates depth data per pixel.

Figure 2:
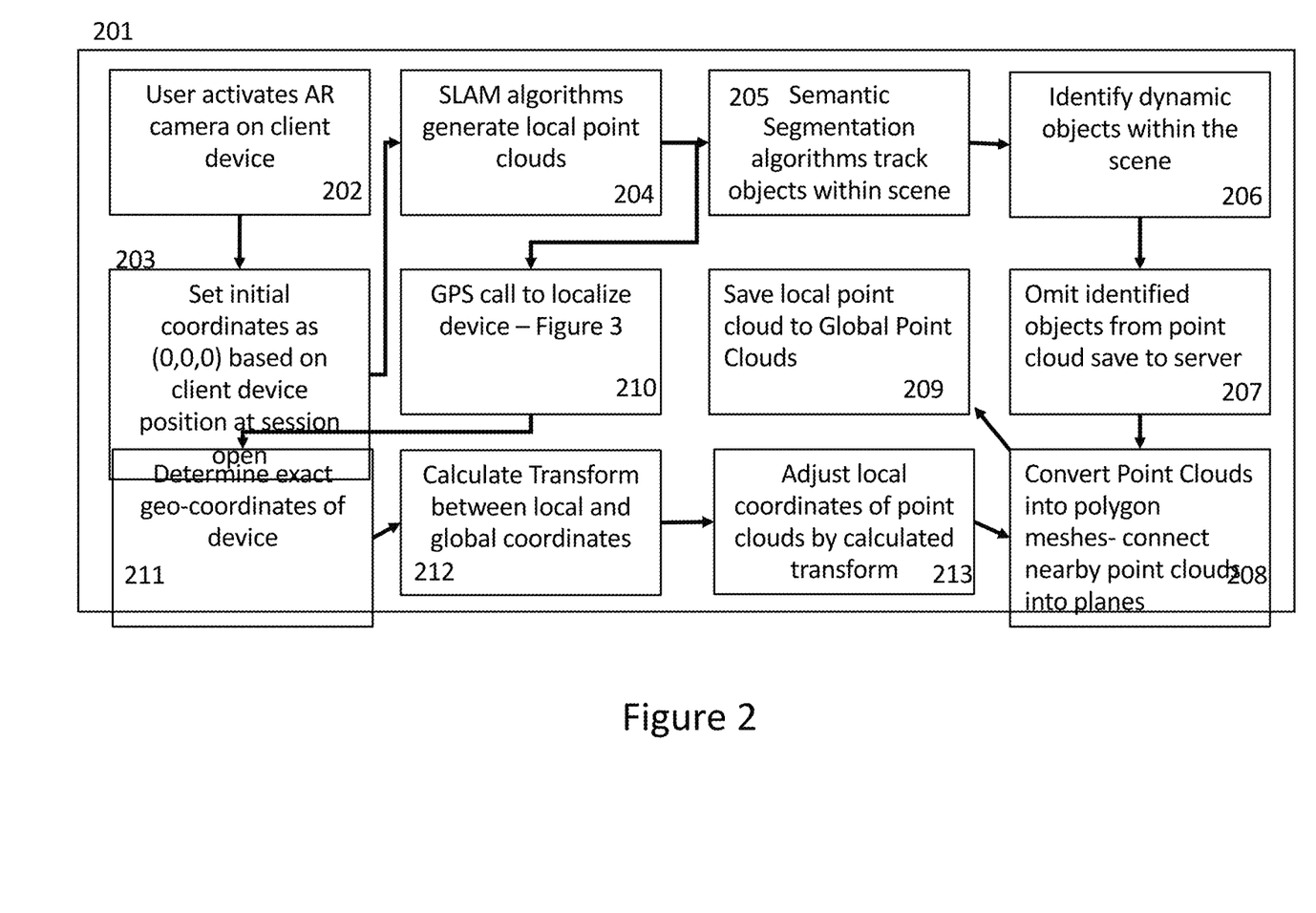
FIG. 2 is a process map for an embodiment of the invention starting with an AR camera activation to generating and saving point clouds to the server.
Figure 3:
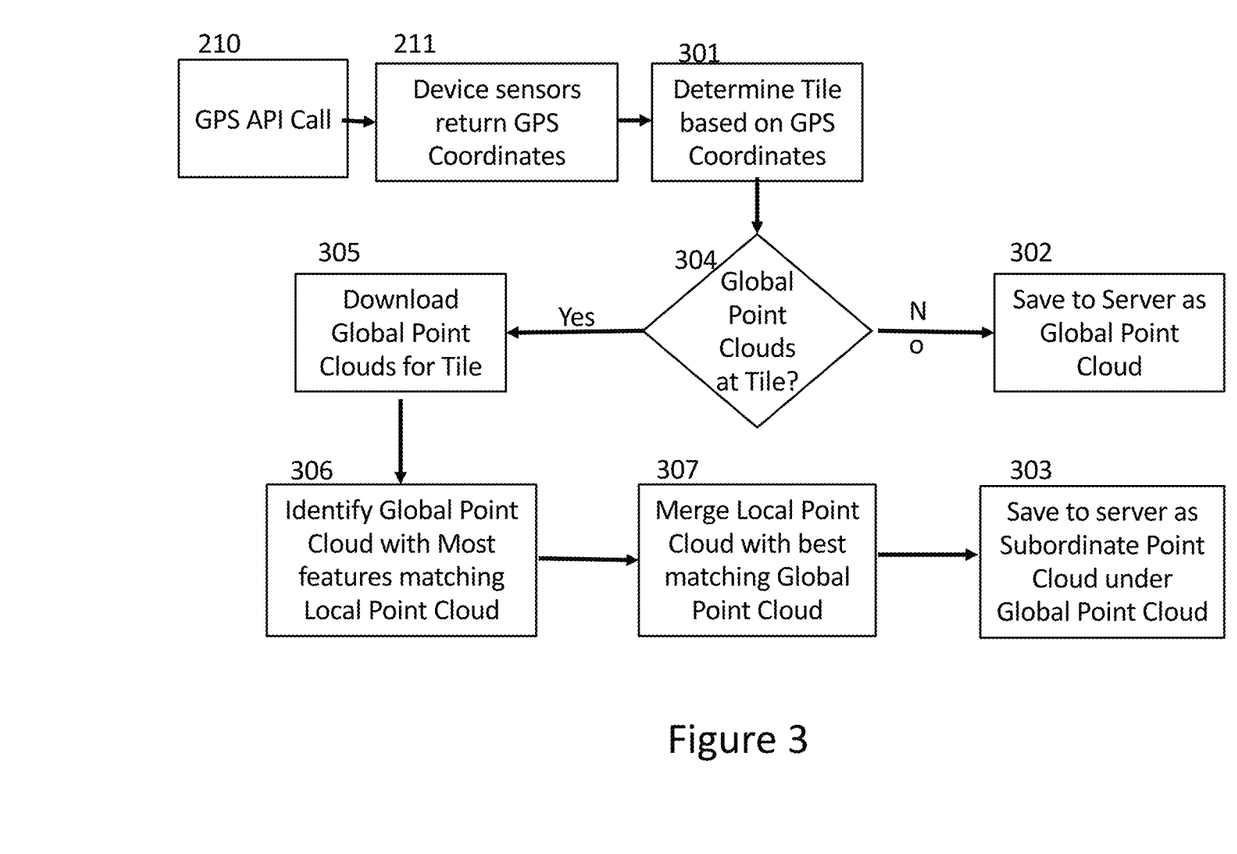
FIG. 3 is a process map for an embodiment of the invention that determines an exact location for a client device and if there is any point clouds on the server for the location.

If no point clouds 111 already exist within the geo-coordinated radius, or if relocalization failed, the system 103 continues to SLAM operations. Semantic Segmentation algorithms 205 run concurrently on the point clouds 111 while SLAM algorithms generate the point clouds. Semantic Segmentation 205 identifies point clouds 111 that compose a specific object and track those point clouds 111 within the scene. One method the system 103 uses is an Interactive Closest Point (ICP) algorithm to match up nearby point clouds 111, identify the point cloud object using image or object recognition APIs that are trained to recognize such objects, construct a bounding box around the identified object, and track the object in the 3D environment across camera image frames. Semantic segmentation omits identified point clouds 111 that should not be saved in the 3D environment such as dynamic objects. Point clouds 111 that should be saved include stationary object and static objects identified through machine learning algorithms since they are likely to remain in the scene.

The system 103 maps and localizes to the 3D point cloud scene 111 at an appropriate frequency as the user traverses the environment. The client sensor data determines the update frequency. One such sensor data point is how fast the user is moving within the environment. Faster movement may be sensed and this information may be used to increase the update frequency. This method localizes the client device and the local environment within the global environment. The system 103 performs relocalization to reduce drift so that geo-coordinates remain synced.

When a local point cloud environment 111 is generated, spatial coordinates 110 of the environment are oriented based on where the client device was positioned when the session began. The system 103 automatically sets the starting position as (0,0,0) 203. The local coordinates may be converted into global coordinates in order to be consistent with other point clouds 111 that are generated by other users. The global environment coordinates are based on real-life GPS coordinates. The exact geo-coordinates of the device may be determined in order to convert the local coordinates to global coordinates.

The system 103 compares the image frames of the camera feed to those in an already-tagged geospatial database to globally localize the local point cloud 111 of a client device 102. The geospatial database includes images of the same scene captured during different times of day, different weather conditions, and different seasons. The system 103 calculates the transform 212 (difference in distance and offset of orientation) by comparing image frames that are geo-tagged to those that are not. This calculates the geo-coordinates of the input images in real-time.

Figure 5:
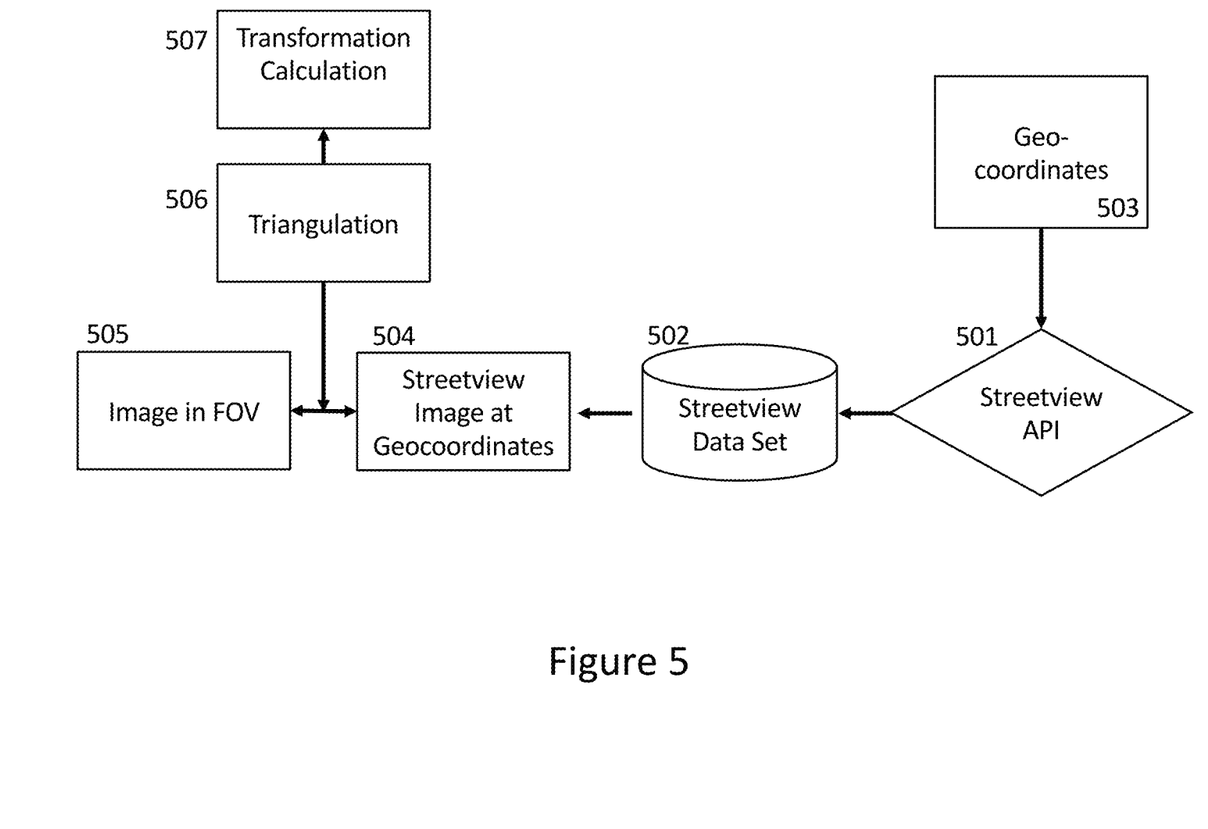
FIG. 5 is one method of using image databases to calculate a client device location and calculate the difference between local point clouds and the global point clouds, according to an embodiment.

One method of obtaining a geo-tagged database utilizes a pre-existing Streetview API 501. In this embodiment, the system 103 searches for images in a Streetview dataset 502 that has a geo-coordinate 503 within the radius of the user. The system 103 identifies an image 504, using feature matching, that has the most features in common with the current device frame 505. The system 103 calculates the difference in orientation of the two images' feature points 110 by using a homography matrix (perspective transform), extended Kalman filters, depth data, and epipolar geometry through triangulation 506. The system 103 then calculates, with 6 degrees of freedom, the transformation 507 in position between the two images 504, 505 using the orientation and depth data. The system 103 finds the latitude, longitude, and altitude of the current image frame by multiplying the transformation value 507 by the geo-coordinates. Altitude is used if provided as a data point within the geotagged image 504. Once the current geo-coordinates are found, the system 103 adds the transformation 507 to the rest of the coordinates in the local environment to become global coordinates 213.

Figure 6:
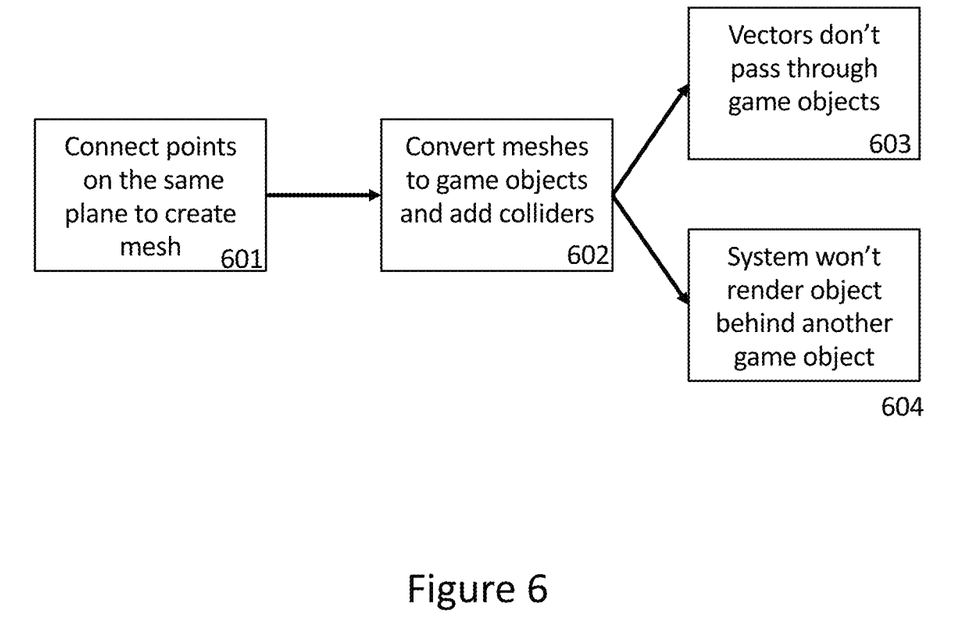
FIG. 6 demonstrates how an embodiment of the system makes objects real.

Meshing 403 occurs after global localization. Point clouds 111 are converted into polygon meshes 402 by connecting nearby point clouds 111 into planes 601. Points 110 that reside on the same plane, with a set threshold of variance, are connected at the edges with other nearby points 110. The system 103 converts meshes 402 into game-objects 105 and adds game engine colliders 602 to the objects 105. Colliders are scripts associated with a game-object that recognize when a second game-object 105 contacts the first game-object 105. Collider scripts may trigger an event such as preventing the first game-object from moving past the second game-object 105. Game-objects 105 allow a 3D object 105 to be interacted with and programmed within the game engine environment 103. The system 103 adds colliders to objects to make other 3D objects/game-objects interact with that game-object realistically. For example, objects are not able to pass through other objects that have colliders.

Additionally, the system 103 recognizes when two identical point clouds 111 at the same location are different because of different current weather conditions compared to when the environment was scanned such as sunshine, rain and snow. The system 103 collects this data from video feeds, images, or from synthetic data. The system 103 uses the images' geo-location data when captured, determined by a basic localization method, such as GPS, or are determined via triangulation and transformation calculations between other localized video feeds and images. This synthetic data may include images and videos (consecutive image frames) that are taken as input into a pre-trained GAN (Generative Adversarial Neural Network) and, by way of deep learning algorithms (neural network) manipulating the RGB and alpha values of the pixels of the inputted image frames, and adversarial deep learning algorithms, such as a neural network, concurrently evaluating the success/effectiveness of the manipulated image, can reproduce accurate copies of the original image frame, making the copy of the image realistically appear as though it is of the same scene as the original image, only during a different time of day, lighting environment/level, season of the year, etc.

Meshing is important for occlusion of 3D content 105 in AR. A game engine 103 uses raycasting to calculate and display what is in the AR camera's FOV 109. The game engine 103 uses vector calculations to track a vector or "beam of light" from each pixel in the frame to the 3D environment. The environment is programmed so that a vector does not pass through the game-object if the object is programmed not to allow a vector to pass through the object's surface 603. The engine 103 will not render 604 any object behind the game-object 105 that the vector interacts with and is occluded from the AR camera's sight 101.

Meshing may be performed in one of at least two locations. The first location is on the client device utilizing a game engine API or SDK. Another location is in the cloud utilizing a game engine API or SDK. In the cloud embodiment, meshing of environments that are preparing to be downloaded to the client are meshed first.

During every frame of the camera feed, the system 103 places an AR camera object at the digital 3D environment geo-location and orientation when the client device is localized in the global environment. This method also occurs when the client device is located in a local point cloud environment 111. This method enables users 106 to view the 3D content that is placed at the user's location within the 3D environment. The system 103 handles the occlusion, scaling, rendering, and perceived movement of the 3D content in the environment, based on how the content is scripted or programmed to behave.

Point clouds 111 and meshes 402 are not rendered within the user's AR camera 108 FOV 109. The meshes 402 are present in the scene but their alpha value or visibility value is set to zero. This makes the meshes invisible within the scene. Users only see content rendered on the screen and not the background 3D reconstruction of the scene. This seamlessly integrates the user's AR experience with their real-world environment.

The system 103 saves the point cloud 111 to the 3D environment at the end of the AR camera 108 session. 3D point clouds 111 stored in the spatial database on the cloud server system represent the 3D environment. The system 103 stores the point clouds 111 with their monochrome values as well as their color coordinate values (e.g., RGB). Semantic segmentation identifies undesireable point clouds. The system 103 omits undesireable point clouds from the upload to the 3D environment. The system 103 attaches relevant metadata to the point clouds 111 then uploads the point clouds 111 to the server 104. Relevant metadata may include, but is not limited to, the client device ID, the transformed global geo-coordinates, and a timestamp. The point clouds 111 are organized in a data structure by geo-location ID. The system 103 parses the geo-location coordinates from the server and populates the point clouds 111 in the 3D environment 111 based on the metadata whenever the the point clouds 111 are rendered or otherwise used in the system 103.

In one embodiment of the invention, the previously described 3D environment system 103 also serves as a framework for user content generation 701.

Within a user upload interface 702, an author 704 uploads an asset 705 to the system 103 or creates an asset 705 within the system 103. The asset 705 (e.g., file or object) includes, but is not limited to, a 3D object or asset file, a 2D or 3D image file, a 2D GIF, a text file, an audio file, an animated asset, a compatible native program file, an image or video captured in the system, a video converted to GIF, or text typed into a dialog. The system 103 converts the asset 705 into a 3D object 105 compatible with display in the system 103. The system 103 calculates the ambient lighting level and direction of the client device 102 using native APIs 703. Otherwise, the sun's 707 movement in the sky is modeled and respresented as an artificial light source 707 within the system 103 so that shadows 711 are cast over the meshes 402 in the 3D environment 101. This provides semi-realistic shadows 711 on user-generated content 105.

The system 103 displays the 3D object 105 on the ground of the environment in the user's FOV 109. The user may manipulate the object 105 in different ways in different embodiments, e.g., by using one or two fingers on the device's screen to rotate, elevate, scale, or move the object laterally or vertically in the scene. The system 103 may generate a shadow 711 below the object 105 to indicate the object's position. The system 103 adds colliders on the object's meshes 402 so that the object 105 cannot be placed inside of objects in the environment 112. The system 103 saves metadata 709 for the object 105 including, but not limited to, the object's geo-coordinates within the scene, orientation, scale, elevation, the user's creator ID, post settings, visibility settings, permissions, options, post ID, tags, description, timestamp, and expiration time stamp.

The object 105 and its relevant content 708 and spatial data 709 may be sent to the system 103 to populate a corresponding polygon-mesh environment. 101. Post content data 709 may be defined as user-generated content 105 encapsulated in a data object. The post content data and metadata are saved to the server database. A check is made to verify if the post 710 is set as ephemeral once the post data 709 is uploaded to the server's database 104. The expiration date is verified if the post 710 is set as ephemeral. The system 103 notifies the distributed clients 712 of a blockchain if the author 704 chooses to notify clients 712. The system 103 compiles a list of users 106 and corresponding client devices 102 to which to send the notification by checking the author's 704 visibility setting for the post 710. This list of users 106 sets who has access to view the post. The list may be compiled by checking the author's 704 visibility graph database. The system 103 sends out a notification to associated client devices 102 based on the notification settings of the individual users 106. The system 103 then adds the post ID 709 and post geolocation 709 to the users' 106 "permission-to-see" database, i.e., a database of all the content the user has permission to see.

The user's client 102 sends out a request to their "permission-to-see" database at a user set frequency of time. The system 103 retrieves any and all posts 710 that the user can view within their visibility radius. The visibility radius is an adjustable radius of the rendered tiles 801 of the digital environment around the user 106. The system 103 retrieves and renders any content 105 at the content's 105 appropriate geolocation if the post 710 is viewable in the "permission-to-see" database. The expiration timestamp of all posts 710 are checked against the current timestamp with every "permission-to-see" database request. The system 103 removes any posts 710 from the database 104 and animatedly fades the post 710 to invisibile if the current timestamp is equal to or greater than the expiration timestamp.

The system 103 opens a 2D user interface (UI) window fragment if the user interacts with rendered content 105 by tapping or touching the content. The system 103 displays or posts content 105 and other relevant data on the screen in a templated form for the user to interact with. In one embodiment, the user 106 has the ability to leave a comment on the rendered content 105.

The original author 704 is credited as the owner if other users 106 collaborate on the content creation 701. The other contributors are added as co-creators in the content's metadata 708. The co-creators' 106 content visibility settings are overridden by the owner's 704 visibility settings if a conflict arises in the settings. Each individual piece displays who contributed to the piece of content 105 when other users 106 interact with collaborated content 105.

An embodiment of the invention permits users 106 to remotely generate content. The previously described transforming local geo-coordinates to global geo-coordinates enables the system 103 to handle remote content generation.

One embodiment of remote user content generation involves saving the content's geolocation and orientation where the user 106 is currently located. This posts the content to the 3D environment at the global geolocation and facing the direction in which the user had faced his or her client device 102 when the user saved the content's location.

Another embodiment of remote user content generation involves manually posting the user's content in the 3D environment. When the user elects to manually post content, the system 103 opens a camera into a game engine environment which shows a digital 3D topological map of the world with the underlying polygon meshes rendered. The user 106 may move the camera through the environment by touching the screen with gestures such as pinching, tapping, swiping, or tracing. The user moves or zooms the camera's FOV to traverse the environment and pass through meshes. The user 106 only has the ability to view public areas or any private area that the user has permission to enter.

Figure 10:
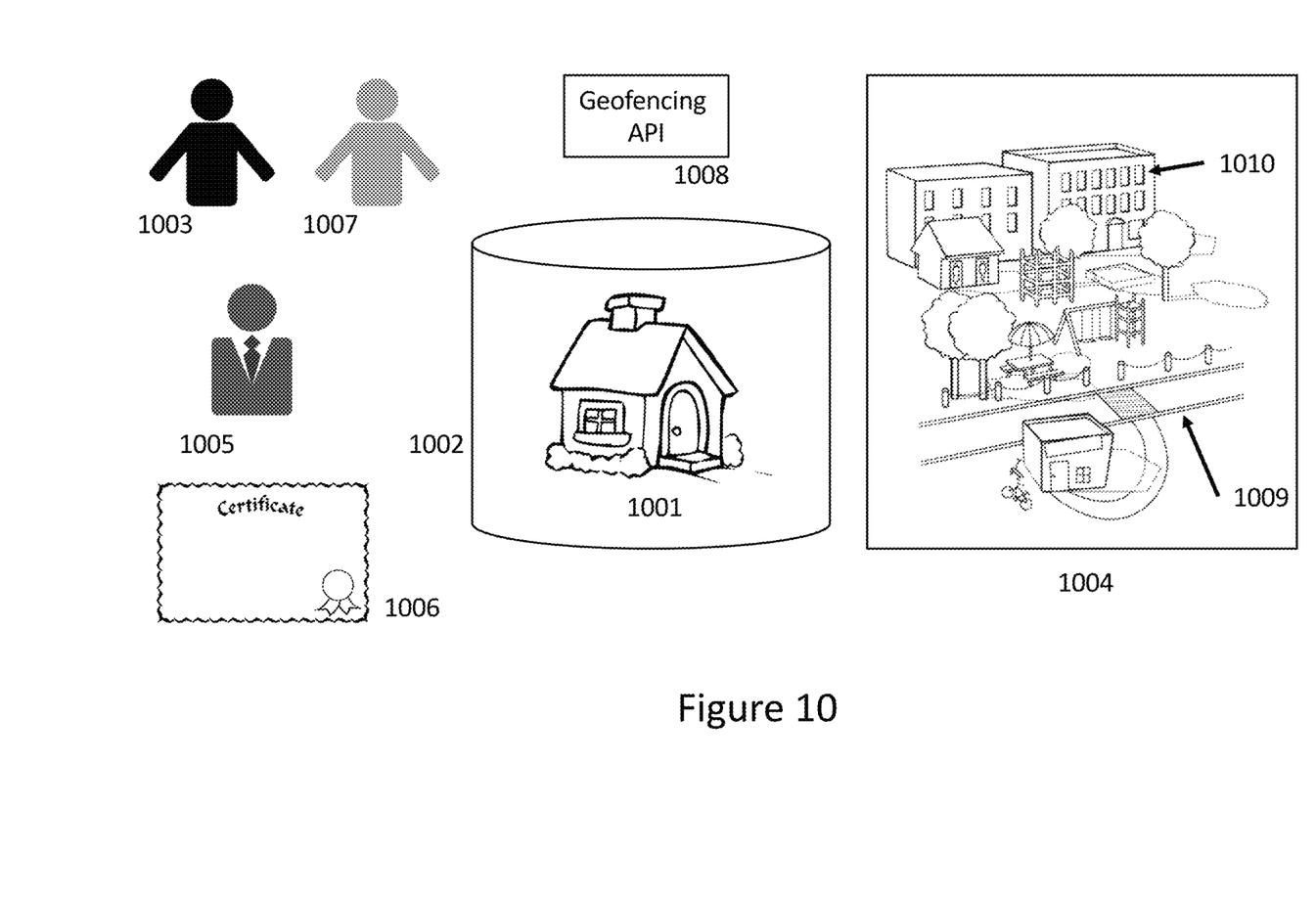
FIG. 10 demonstrates a break down in areas from public to private and the security provided to private property owners.

The author 704 creates content 105 in a manner such as that previously discussed 701, and may then place the content 105 in a scene where the user 106 moves the camera. The system 103 may not permit the user to place content in a private area 1001 where the user 106 has been given permission to enter, but has not been given permission to place content 105.

Another embodiment of remote user content generation 701 involves automatically placing the user-generated content 105 in the 3D environment 101 using external data APIs and data input. One type of data input is point of sale data from a business.

In this embodiment, the author 704 has an option to designate the content 105 for automatic display. The system 103 places a post or content 105 in an area that will target a certain type of user 106 and generate the most impressions by a target user type within a certain area. The system 103 trains a Convolutional Neural Network (CNN) 901 to locate a tile 801 in an optimal location for a post 710 to generate the most amount of impressions using data gathered by APIs, user behavior, and geospatial data. Geographical Information System (GIS) APIs 902 may determine the optimal orientation for the post 710 within the optimal location. For example, a spatial map API, utilizing a building map, may determine the closest route from the tile 801 to a hallway 903 then orient a post 710 in the direction of the vector of "least distance to more impressions."

In order to reduce the possibility of placing the post in an occluded position, the system 103 may segment the tile 801 into smaller tiles 904 where no points 110 in the point cloud 111 are not in a horizontal plane. The smaller tile 904 only has floor or ground plane points 110. The system 103 finds the optimal smaller floor tile 904 by balancing which of the tiles 904 is the farthest from a wall or vertical object tile 801 with the closest area of most impressions. The post 710 is anchored to the optimal location and the metadata is saved to the database 104.

Another embodiment of the invention allows a author 704 to automatically place content 105 at a location 905 by reserving the location 905 prior to placing the content 105. When a trigger 906 is activated the post 710 and all relevant content 105 is loaded from the database 104 based on the commands of the trigger 906. The system 103 displays the post 710 to all appropriate users 106.

Another embodiment of the invention combines both automatic remote user content embodiments. For example, the system 103 utilizes an API to access a database that provides contextual information about a person, place or thing to parse the information and gather the geolocation associated with the information. The system 103 uses GIS APIs 902 to calculate where to place the contextual information for the most impressions based on the relative radius of the geolocation. This makes the contextual information useful and effective. When the information on the underlying site is updated, the information in the post 710 will be updated as well by utilizing calls to the API's database listener.

One embodiment of the invention allows users 106 to filter the content 105 displayed within their AR display 101. This allows users 106 to choose what content 105 they want to see. Limiting displayed content 105 may help prevent or mitigate overwhelming the user 106 with visual stimuli.

The system 103 allows a user 106 to filter content 105 without causing the content 105 to never be viewable again through content visibilities and filters. A user 106 has the option to categorize their connection with another user 106. For example, the user 106 may set the other user 106 as a close friend, friend, acquaintance, colleague, or employer. Setting different connection types allows the user 106 to set a separate visibility for content 105 from the connection type. Other possible methods of visibility control include filtering content 105 from a group the user 106 subscribes to, topics that users 106 tag their content 105, or by types of media (i.e. images or videos). Content 105 might have multiple visibility settings.

An author 704 selects the granted visibility for their content 105 when the author 704 creates a post or when editing the post. Other users 106 access the post 710 based on the visibility settings granted by the post's author 704. One method the system 103 uses to determine the visibility of the post 710 is through social graph traversal in the user's 106 connections graph database.

An embodiment of the invention allows users 106 to filter content 105 by searching for specific visibilities, tags, and characteristics of posts 710 when viewing content 105 in the AR camera view 101. A user 106 has access to view and interact with content 105, but also has the ability to filter the content 105 out of sight. For example, when a user 106 approaches an area that is cluttered or overlapping, to filter out unwanted content 105, the user 106 may touch the content 105 on their device's 102 screen or, through their AR camera view 101, and swipe the content 105 away. The user 106 may also have the option of moving the content 105 within the scene. This content 105 is only moved for the individual user 106 for the duration of the AR camera session. A small orb 907 may appear underneath where the content 105 was originally located when the user 106 swipes the content away. Tapping on the orb 907 returns the content 105 to its original position.

Another embodiment of the invention also allows a user 105 to filter posts 710 by the post's metadata. Options for filtering include the post's 710 characteristics, its topic, its type, or its creator. A user 105 searches for this metadata and chooses to only display posts 710 containing the search inquiry or hide posts 710 based on the inquiry. Posts 710 that do not meet the previous criteria are not rendered in the system 103 and not viewable in the AR display 102. Content 105 appears as if it exists in different layers due to the results of what content 105 is rendered and displayed. Game-objects 105 may be deactivated so that the user 106 does not accidentally interact with the content 105 when the content 105 is not displayed.

Another embodiment of the invention displays content 105 to a user 106 based on post 710 priority and the user 106 behavior and settings. The system 103 assigns a post 710 priority value based on the post's 710 characteristics. These characteristics may include, but are not limited to, the post author 704, the type of post, or the post topic. Post 710 priority allows the system 103 to display higher priority content 105 to a user 106 in a content-crowded 3D environment 101. The system 103 displays higher priority content 105 in front of or on top of lower priority content 105.

An embodiment of the invention uses blockchain 1101 and smart contracts 1102 to protect user 106 security. For example, one embodiment of the the invention allows users 106 to manage the content 105 visibility permissions through blockchain 1101 using smart contracts 1102. Another example is where an embodiment of the invention allows users 106 to store their point clouds 111 to a blockchain 1101 instead of to a single server or a cloud 104.

While there are many types of point clouds 111, two basic types are discussed here: public and private point clouds 111.

Public point clouds 111 are point clouds 111 that exist in public areas such as parks 1004, roads 1009, or the facades of buildings 1010. The facades of buildings 1010 may be considered public even if the underlying building exists on private property 1001. A client device 102 must have access to the public point clouds 111 in order to localize the client device 102. This invention may use an AR cloud generation API that encrypts point clouds 111 and converts them into sparse point clouds 111. Users 106 will not be able to reverse engineer the public point clouds 111 into an identifiable 3D scene 101 because the encryption prevents access to the underlying public point clouds 111.

Private point clouds 111 may be determined through geofencing API 1008 and GIS API 902 calls using publicly-available data. Private property owners 1003 may provide proof of ownership of the property 1001 to a system administrator 1005. Once approved, the administrator 1005 assigns a certificate of ownership 1006 to the property owner 1003. The system 103 stores the certificate of ownership 1006 to a blockchain ledger in the property owner's name 1003. The system 103 will also store the geofence 1002 coordinates on a blockchain ledger to indicate the boundaries 1002 of the property owner's property 1001. The system 103 allows a property owner 1003 to grant, deny, or revoke access to other users 106. The categories of other users 106 may include, but are not limited to, certain other specific users 106, groups of users 712, specific companies, or types of companies. The property owner 1003 may control the length of access, the type of access, or the cost of accessing the property 1001. The type of access includes, but is not limited to, whether the user 106 only has permission to view content 105, interact with content 105, or post content 105 on or within the boundary of the property 1001.

The system 103 forms a smart contract 1102 between the property owner 1003 and the other user 106 when the property owner 1003 grants, denies, or revokes access to the property owner's property 1001. The system 103 saves the smart contract to a blockchain ledger 1101. The system 103 forks the blockchain 1101 to form a new smart contract 1102 when a smart contract 1102 needs to be amended. The new smart contract 1102 is forked by the rest of the nodes on the blockchain 1101 as long the smart contract 1102 displays no sign of being tampered with and the property owner 1003 shows the desire to continue to interact with that user 106. The user 106 interacting with the blockchain 1101 thread automatically accepts the fork that was made by that user 106.

One embodiment allows the property owner 1003 to grant permission to a property manager 1007 to administer the property owner's property 1001.

The system 103 applies the same rules to 3D polygon meshes 402 that it applies to point clouds 111 with one exception. Public meshes 402 do not include the facades of buildings 1010 within the bounds of a private property 1002. Only sparse point clouds 111 include those facades 1010.

The system 103 makes a call to a geofencing API 1008 to determine the zoning location of a point cloud 111 when the point cloud 111 is contructed and globally localized.

If the point cloud 111 is located within the bounds of a private property 1002 the system 103 indicates this in the point cloud's 111 metadata. The system 103 then queries the blockchain ledger 1101 to determine the property owner 1003 where the point cloud 111 resides. The system 103 saves the user's 106 encrypted ID in the metadata of the point cloud 111 which will be decrypted when accessed.

If the point cloud 111 data indicates that it resides on private property 1001 but is generated from a device 102 positioned on public property 1004 or other private property 1001, then the system 103 may save within that point cloud's 111 metadata that the point cloud 111 is public access on private property. Point clouds 111 with this metadata distinction enable client device 102 localization, but prohibit mesh construction from the point clouds 111.

If the point cloud 111 is located on private property 1001, then the system 103 saves that only the point cloud 111 is public to the point cloud's 111 metadata. The point clouds 111 are not meshed 403 if the private property owner 1003 or manager 1007 does not grant private permissions to the user 106. Point clouds 111 with this metadata distinction enable client device 102 localization, but prohibit mesh construction from the point clouds 111.

The system 103 verifies point cloud 111 metadata when localizing a client device 102 or when performing feature matching. The system 103 checks whether the point cloud 111 is public, public access on private property, or private. The system 103 checks the owner metadata and the blockchain 1101 smart contracts 1102 for user permissions if the point cloud 111 is private or public access on private property. The system 103 permits access to the extent granted by the owner 1003 through the smart contract 1102. Only the client device 102 is localized if the point cloud 111 is public or public access on private property.

The invention claimed is:

1. A computer executable three-dimensional (3D) media generation method for an augmented reality environment system, comprising:
    converting user-authored media into a 3D object;
    adjusting the 3D object lighting levels to match ambient environment lighting levels;
    placing the 3D object on a bottom surface of a field of view of a user within an augmented reality environment;
    within the augmented reality environment, allowing the user to 1) manipulate an orientation, scale, or elevation of the 3D object or 2) move the 3D object laterally or vertically;
    generating a shadow below the 3D object to indicate a position of the 3D object;
    creating colliders for the 3D object;
    using the colliders to prevent the 3D object from being placed within other objects in the augmented reality environment;
    saving the 3D object, wherein the saving comprises storing geo-coordinates of the 3D object; and
    storing the 3D object at a corresponding polygon-mesh environment at a local and/or global geo-coordinate map.

2. The method of claim 1, further comprising displaying a user selected global location within the user's field of view, wherein the user can manually place the 3D object at the user selected global location if the user has permissions to display the 3D object at the user selected global location.

3. The method of claim 1, where the user can automatically position the 3D object at a particular location based on a parameter selected by the user, if the user has permissions to display the 3D object at the particular location.

4. The method of claim 3, where the location and the orientation of the 3D object are automatically adjusted within a designated area by the augmented reality environment system based on data generated from a Convolutional Neural Network to maximize visibility to augmented reality environment system users.

5. The method of claim 3, where an object author reserves a global location to place the 3D object based on a predefined trigger.

6. The method of claim 3, where the location and the orientation of the 3D object are automatically adjusted by third party application programming interfaces (APIs) or software development kits (SDKs).

7. The method of claim 1, where the user can remove the 3D object manually or automatically based on a predefined trigger.

8. The method of claim 1, further comprising: receiving the user-authored media via an upload from the user, performed before the conversion.

9. The method of claim 1, wherein the saving further comprises storing one or more of following data points about the 3D object: the orientation, the scale, the elevation, user author ID, post settings, visibility settings, permissions, options, object ID, tags, description, timestamp, and expiration timestamp.

10. The method of claim 1, wherein the user selects a particular augmented reality system and point cloud mapping software/application programming interface source and/or medium to author content remotely.

11. The method of claim 10, where the particular augmented reality system verifies permission level of the user to author a particular object within the particular augmented reality system.

* * * * *